(12) United States Patent
Lindner

(10) Patent No.: US 10,878,334 B2
(45) Date of Patent: Dec. 29, 2020

(54) PERFORMING REGRESSION ANALYSIS ON PERSONAL DATA RECORDS

(71) Applicant: VEDA Data Solutions, Inc., Washington, DC (US)

(72) Inventor: Robert Raymond Lindner, Fitchburg, WI (US)

(73) Assignee: VEDA Data Solutions, Inc., Washington, DC (US)

( * ) Notice: Subject to any disclaimer, the term of this patent is extended or adjusted under 35 U.S.C. 154(b) by 575 days.

(21) Appl. No.: 15/073,007

(22) Filed: Mar. 17, 2016

(65) Prior Publication Data
US 2017/0270426 A1    Sep. 21, 2017

(51) Int. Cl.
*G06N 20/00* (2019.01)
*G06F 16/28* (2019.01)
*G06F 16/2458* (2019.01)

(52) U.S. Cl.
CPC ......... *G06N 20/00* (2019.01); *G06F 16/2465* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2015/0213372 A1* | 7/2015 | Shah | H04L 12/58 706/12 |
| 2016/0188876 A1* | 6/2016 | Harris | G06F 21/554 726/23 |
| 2016/0365945 A1* | 12/2016 | Bakulin | H04L 1/0041 |

OTHER PUBLICATIONS

Tibshirani, R., "Model selection and validation 1: Cross Validation," Course Notes for Spring 2013 Data Mining 36/462, verified available before Sep. 2013 by the Internet Archive, <https://web.archive.org/web/20130909050802/http://www.stat.cmu.edu/~ryantibs/datamining/lectures/18-val1.pdf>, 26 pp. (Year: 2013).*

Darken, C. et al., "Learning rate schedules for faster stochastic gradient search," Proc. of the 1992 Workshop on Neural Networks for Signal Processing II (1992) pp. 3-12. (Year: 1992).*

(Continued)

*Primary Examiner* — Brian M Smith

(74) *Attorney, Agent, or Firm* — Sterne, Kessler, Goldstein & Fox P.L.L.C.

(57) ABSTRACT

Disclosed herein are system, method, and computer program product embodiments for performing a regression analysis on lawfully collected personal data records. The analysis enables discovery of individuals likely to perform certain actions based on their personal data records and the personal data records and actions of others. The disclosed system, method, and computer program product may process vast quantities of data, including personal data records with thousands of categories and lawfully stored databases with millions of personal data records. Through the regression analysis, the disclosed system, method, and computer program product learn the most relevant categories for predicting an individual's actions based on input data provided by a user. The analysis then analyzes the categories of personal data records stored in a lawfully stored database to predict actions of individuals associated with those records and outputs results to the user.

17 Claims, 5 Drawing Sheets

(56) References Cited

OTHER PUBLICATIONS

Algamal, Z.Y. et al., "Applying penalized binary logistic regression with correlation based elastic net for variables selection," Journal of Modern Applied Statistical Methods, vol. 14, Issue 1 (2015) pp. 168-179. (Year: 2015).*

Zou, H. et al., "Reguralization and variable selection via the elastic net," J.R. Statist. Soc. B, vol. 67, Part 2 (2005) pp. 301-320. (Year: 2005).*

Breiman, L., "Stacked Regressions," Machine Learning, vol. 24 (1996) pp. 49-64. (Year: 1996).*

Pedregosa, F., "Hyperparameter optimization with approximate gradient," downloaded from <arxiv.org/abs/1602.02355v2> with an upload date of Feb. 9, 2016, 14 pp. (Year: 2016).*

Wang, G. et al., "The kernel path in kernelized LASSO," Artificial Intelligence and Statistics (2007) pp. 580-587. (Year: 2007).*

* cited by examiner

PERFORMING REGRESSION ANALYSIS ON PERSONAL DATA RECORDS

FIELD OF THE INVENTION

The present invention generally relates to the field of data mining. In particular, the present invention relates to a computer-based method and system operable to predict an action of an individual based on personal data records of a plurality of individuals.

BACKGROUND

Systems exist for lawfully collecting information describing characteristics or behavior of different people. Lawfully collecting such personal information has many applications, including in political and other fundraising, healthcare, marketing, and other fields. An action or transaction may generate data records specific to that action and the individual who performed it. For example, the major credit bureaus maintain and sell access to databases of personal financial data records for nearly every individual with a line of credit (e.g., a credit card, auto loan, mortgage, etc.) in the United States. As another example, databases with information describing mortgage information also are lawfully available.

Databases of personal data records may contain distinct records corresponding to the same individual. For example, an individual may have multiple mortgages over the course of a lifetime. Other types of lawfully available databases may maintain a single data record for an individual or social security number. Such records may be updated periodically or as events occur that affect an individual's data record.

A personal data record may include a number of categories. A data record representing an individual mortgage may include categories such as the name of the individual, his or her city, state, and ZIP code, the individual's employer, the name of the mortgage provider, the interest rate, and the amount of the loan. Data records from different sources may comprise different categories.

Such personal data may be used to predict whether an individual will engage in particular behavior. For example, the personal data may be used to predict whether an individual is likely to buy a product or participate in a marketing campaign.

Improved techniques for predicting behavior from personal information are needed.

BRIEF SUMMARY

The present disclosure provides a method and system operable to predict an action of an individual based on personal data records of a plurality of individuals. The disclosed method and system may utilize knowledge that a certain individual performed an action, as well as the personal data records of the individual who performed the action, to find individuals who are likely to perform the same or similar action.

In an embodiment, the present disclosure provides a method for predicting an action of an individual based on a plurality of personal data records. The method operates on a training set and a data set. The training set comprises a plurality of personal data training records, a plurality of categories associated with each personal data training record, and an action taken by an individual corresponding to the associated personal data training record. In an embodiment, the data set comprises a number of personal data records greater than the number of personal data training records in the training set. The method includes accessing the training set stored in memory and determining a subset of categories based on at least one personal data training record in the training set. The method then determines a prediction function that outputs an outcome score of a personal data record based on values of the subset of categories, and tests the accuracy of the prediction function based on at least one personal data training record in the training set. The method continues by accessing the data set and processing a subset of the personal data records in the data set based on the prediction function to determine an outcome score for each personal data record in the subset of personal data records.

System and computer program products are also disclosed.

Further embodiments, features, and advantages of the invention, as well as the structure and operation of the various embodiments, are described in detail below with reference to accompanying drawings.

BRIEF DESCRIPTION OF THE DRAWINGS

A further understanding of the present disclosure can be obtained by reference to the preferred embodiment and alternate embodiments set forth in the illustrations of the accompanying drawings. Although the illustrated embodiments are merely exemplary of systems for carrying out the present invention, both the organization and method of operation of the invention, in general, together with further objectives and advantages thereof, may be more easily understood by reference to the drawings and the following description. The drawings are not intended to limit the scope of this disclosure, which is set forth with particularity in the claims as appended or as subsequently amended, but merely to clarify and exemplify the invention. For a more complete understanding of the present disclosure, reference is now made to the following drawings in which:

In the drawings, like reference numbers generally indicate identical or similar elements. Additionally, generally, the left-most digit(s) of a reference number identifies the drawing in which the reference number first appears.

DETAILED DESCRIPTION

Embodiments use regression analysis on personal data records to predict behavior of individuals corresponding to those records. As is set out below, a regression model is trained using a data set with data about individuals and their past behavior. The trained regression model is used to forecast whether other individuals will engage in the same behavior.

As required, a detailed illustrative embodiment of the present invention is disclosed herein. However, techniques, systems and operating structures in accordance with the present disclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of a preferred embodiment as well as alternate embodiments such as a simpler embodiment or more complex embodiments for alternate devices of the present invention.

Figure 1:
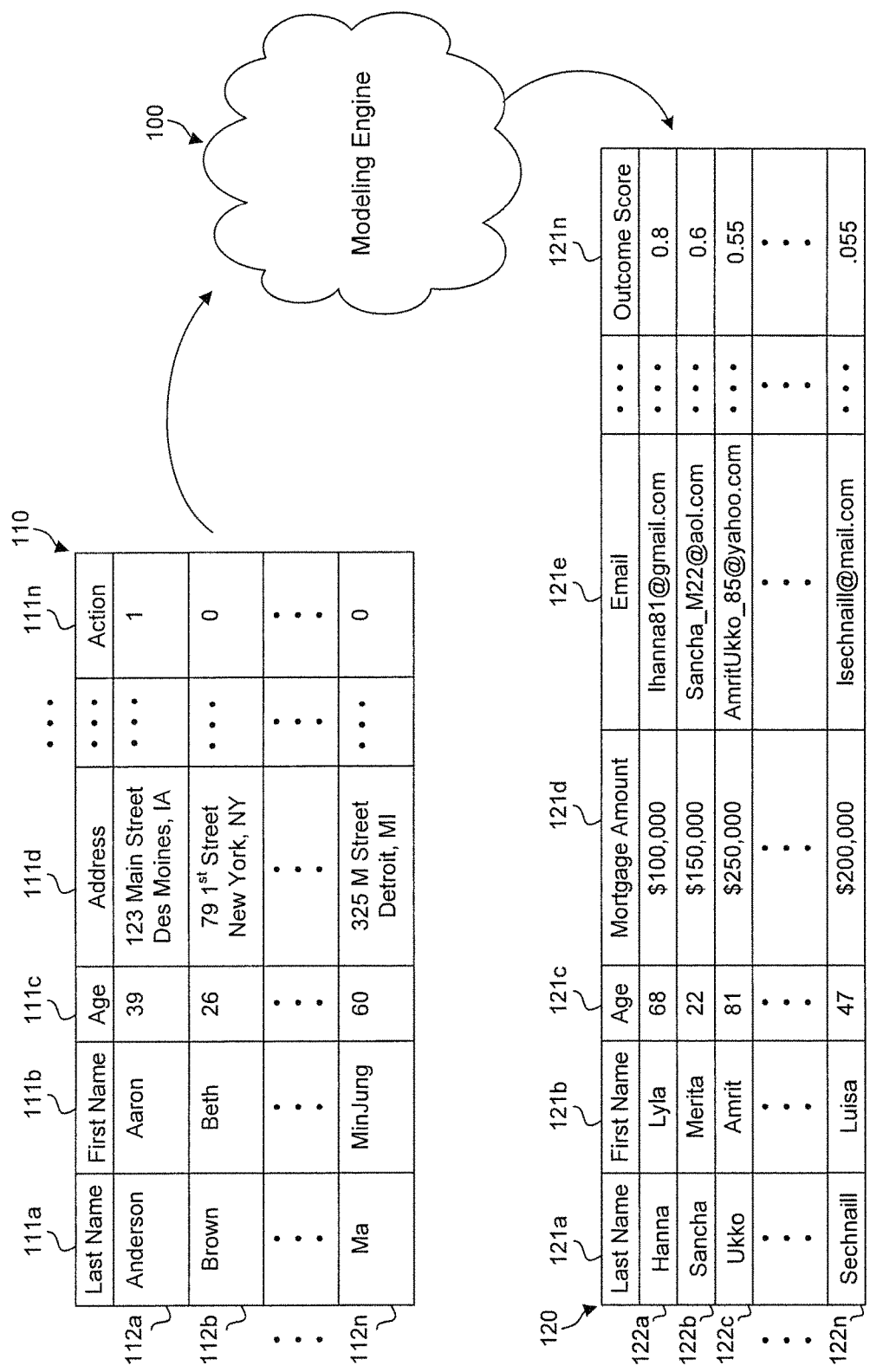
FIG. 1 illustrates an example input and output of a modeling engine, according to an embodiment of the present invention.

FIG. 1 illustrates an example input and output of a modeling engine 100, according to an embodiment. Modeling engine 100 receives an input set 110 of personal data records 112a-112n and outputs an output set 120 of personal data records 122a-122n.

Each personal data record 112 in the input set 110 comprises a plurality of categories 111a-111n. In an embodiment, each personal data record 112 in the input set 110 comprises a last name 111a, first name 111b, age 111c, address 111d, and action 111n. As a skilled artisan would understand, the input set 110 is not limited to the disclosed categories and may include a very large number of categories, both textual and numerical. Furthermore, categories 111 are not limited to the formatting illustrated in FIG. 1. For example, categories 111a ("Last Name") and 111b ("First Name") may instead be combined into a single category titled "Full Name."

Each personal data record 112 in input set 110 includes an action 111n. For each personal data record 112 in input set 110, the action category 111n is a representation of an action performed, or not performed, by the individual corresponding to the personal data record 112. Action 111n may describe, for example, whether an individual associated with a certain personal data record 112 subscribed to a specific newsletter or purchased a specific product. However, input set 110 need not provide any indication as to what underlying action the action category 111n pertains to. In an embodiment, there may not be a single underlying action for action category 111n. For example, for personal data record 112a, the value in action category 111n may correspond to whether Aaron Anderson has a mortgage, whereas for personal data record 112b, the value in action category 111n may correspond to whether Beth Brown subscribed to a mailing list for a product.

In an embodiment, the action 111n comprises a binary value. For example, personal data record 112a in FIG. 1 shows that Aaron Anderson of Des Moines, Iowa performed the action because the value in action category 111n is '1' in personal data record 112a. Conversely, personal data records 112b and 112n show that Beth Brown of New York, N.Y. and MinJung Ma of Detroit, Mich. did not perform the action because the value in action category 111n is '0' in personal data records 112b and 112n. In other embodiments, the action 111n is a real number. In another embodiment, the action 111n comprises the number of occurrences of a given event in relation to an individual.

Two personal data records 112 in the input set 110 may comprise the same values for a category 111. However, modeling engine 100 assumes that each personal data record 112 in the input set 110 is associated with a distinct individual. Accordingly, in an embodiment, at least one category 111 contains a different value for any two personal data records 112 in input set 110. In another embodiment, the input set 110 may contain duplicate personal data records 112.

Each personal data record 122 in the output set 120 comprises a plurality of categories 121a-121n. The categories 121a-121n in the output set 120 are not limited to the categories 111a-111n in the input set 110. For example, categories 121a-121n of output set 120 may include political party 121d, credit score 121e, and email address 121f, which may not be included in categories 111a-111n of input set 110. In an embodiment, each personal data record 122 in the output set 120 comprises a last name 121a, first name 121b, age 121c, political party 121d, credit score 121e, email address 121f, and outcome score 121n. As a skilled artisan would understand, the output set 120 is not limited to the disclosed categories and may include a very large number of categories, both textual and numerical. Furthermore, categories 121 are not limited to the formatting illustrated in FIG. 1. For example, categories 111a ("Last Name") and 111b ("First Name") may instead be combined into a single category titled "Full Name."

Each personal data record 122 in output set 120 includes an outcome score 121n. In an embodiment, outcome score 121n represents the probability that the individual associated with a personal data record 122 will perform the action(s) corresponding to action category 111n of input set 110. In another embodiment, outcome score 121n represents the probability that the individual associated with a personal data record 122 will perform an action similar to the action(s) corresponding to action category 111n of input set 110. In another embodiment, outcome score 121n is monotonically related to the probability that the individual associated with a personal data record 122 will perform the action(s) corresponding to action category 111n of input set 110. When action 111n represents the number of occurrences of an event, the outcome score 121n may predict the number of occurrences of the event.

Personal data records 122 in output set 120 correspond to different individuals than the individuals associated with personal data records 112 in output set 110. Whether the individuals corresponding to output set 120 will perform an underlying action associated with action category 111n is uncertain. Conversely, whether individuals corresponding to input set 110 performed the action is known. Data describing whether individuals corresponding to input set 110 performed the action is provided to the modeling engine 100 via action category 111n. Accordingly, unlike the input set 110, the output set 120 does not include action category 111n.

If action 111n describes, for example, whether an individual associated with a certain personal data record 112 donated money to a specific political campaign, then outcome score 121n may describe a probability that an individual associated with a certain personal data record 122 in output set 120 will donate money to that same political campaign. As with input set 110, however, output set 120 need not provide any indication as to what underlying uncertain action the outcome score 121n pertains to. In an embodiment, the outcome score 121n comprises a decimal value between 0.0 and 1.0. For example, personal data record 121a in FIG. 1 shows that Lyla Hanna will perform the action(s) associated with action category 111n with probability 0.8. Similarly, personal data records 122b, 122c, and 122n show that Merita Sancha, Amrit Ukko, and Luisa Sechnaill will perform the action(s) associated with action category 111n with probabilities 0.6, 0.55, and 0.55, respectively.

Figure 2:
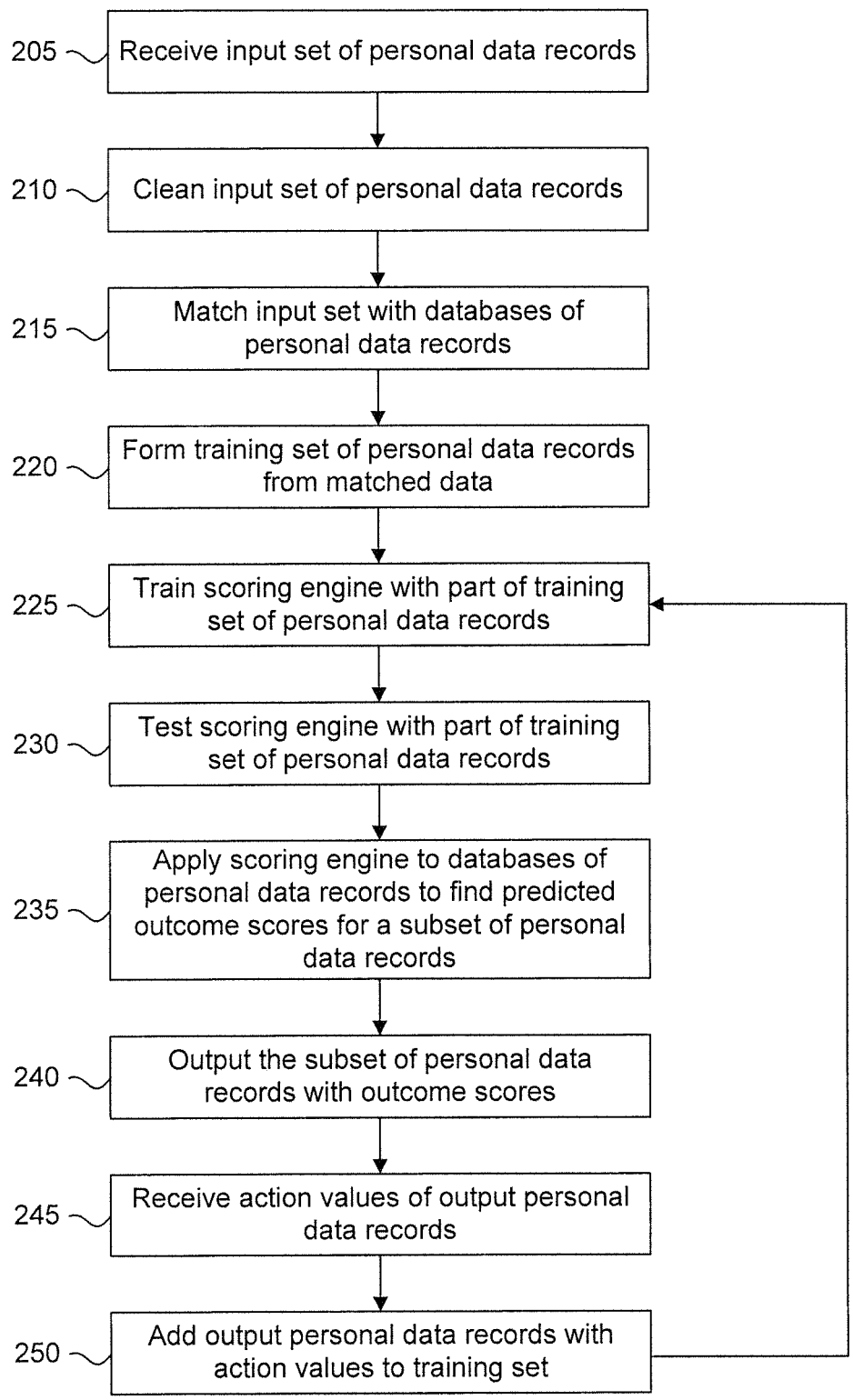
FIG. 2 is a flowchart of an exemplary method for predicting actions based on personal data records.

FIG. 2 is a flowchart of an exemplary method for predicting actions based on personal data records. In an embodiment, FIG. 1's modeling engine 100 processes the input set 110 using the steps shown in FIG. 2 to output the output set 120. The method begins at step 205 by receiving an input set of personal data records. In an embodiment, step 205 comprises the modeling engine 100 receiving input set 110 of personal data records 112.

The method continues at step 210 by cleaning the input set of personal data records. The step of cleaning transforms the input set into a consistent format useable for the remainder of the method. The input set, for example, may not have sufficient structure or labeling for data mining. Cleaning step 210 may parse the data within each personal data record and assign the parsed data to predetermined categories that match the format of personal data records in lawfully stored databases.

In step 215, the method matches personal data records in the input set with personal data records lawfully stored in a database. The term "matching" refers to determining that two or more personal data records correspond to the same individual. Since personal data records in a lawfully stored database may contain more categories than personal data records in the input set, matching a personal data record from the input set to a personal data record in a lawfully stored database may enable the use of more categories for training and testing a scoring engine within the modeling engine. Matching step 215 may comprise comparing the categories of the cleaned input set with personal data records stored in a lawfully stored database using a pair-wise function. Based on the comparison, matching step 215 may further comprise calculating a similarity score for each pair. In an embodiment, when the similarity score exceeds a predetermined threshold, matching step 215 may link and/or combine the personal data records.

In step 220, the method forms a training set of personal data records from the matched data in the lawfully stored database. The personal data records in the training set may also be referred to as personal data training records. The training set is a set of personal data records from the lawfully stored database corresponding only to individuals represented by personal data records in the input set. In an embodiment, the training set is divided into two subsets. The first subset is used to train the scoring engine in step 225, and the second set is used to test the scoring engine in step 230. In another embodiment, the training set of personal data records may be divided into a plurality of subsets such that may alternate being used to train the scoring engine in step 225 and testing the scoring engine in step 230.

In step 225, the method trains the scoring engine using a subset of the training set of personal data records designated for training. During training, a model for the scoring engine is assumed. In an embodiment, the scoring engine is assumed to take the form of the following function:

$$P = \frac{e^{\theta^T x}}{1 + e^{\theta^T x}}$$

where P is the outcome score, e is Euler's number (approximately 2.71828), θ is a column vector of parameters, and x is a column vector of values corresponding to categories of a personal data record. In the above equation, the letter 'T' represents the vector transpose operation. The vectors $\theta = [\theta_1, \theta_2, \ldots, \theta_N]^T$ and $x = [x_1, x_2, \ldots, x_N]^T$ are both of size N×1, where N is the number of categories, excluding the action category, in the personal data records that form the training set. In other embodiments, insubstantial changes may be made to the above prediction function. The insubstantial changes may include adding small offsets, coefficients, and exponents.

In the above embodiment, a goal of training the scoring engine is to find θ such that the outcome score P accurately predicts whether an individual will perform the action(s) described by the action category of the training set based on the individual's personal data record(s). For the individuals represented in the training set, whether or not the individual performed the action(s) is known. Provided with a large enough training set, therefore, the goal of predicting outcome scores for individuals not represented in the training set may be approximated by finding θ that minimizes a difference between P and the action category for the training set, given a set of constraints on the structure of θ.

In some embodiments, N>1000. In other words, the number of categories about an individual may be over a thousand. In cases where a large number of categories exist, computation of the term $\theta^T x$ may be computationally intractable over a large database, which may contain hundreds of millions or billions of distinct personal data records (i.e., hundreds of millions of different x's). It may therefore be advantageous to impose structure on θ such that $\theta_i = 0$ for most i. When $\theta_i = 0$, the ith category plays no role in the scoring engine and can therefore be ignored. In effect, the size of vectors θ and x can be reduced from N×1 to $\hat{N} \times 1$ where $\hat{N} \ll N$. Specific methods for minimizing $\hat{N}$ while maintaining an accurate scoring engine are described in further detail below relative to FIG. 3.

After the scoring engine has been trained, step 230 tests the scoring engine using personal data records from the training set that were not used in training step 225. The personal data records employed in step 230 may also be known as a test set. Testing compares the outcome score predicted for a personal data record in the test set with the action category for that personal data record and assigns a predictor score to the scoring engine.

In an embodiment, the predictor score is the mean squared error of the outcome scores relative to the action categories for each personal data record in the test set. Mathematically, such a predictor score would take the form $$S = \frac{1}{R} \sum_{r=1}^{R} (P_r - A_r)^2$$

where S is the predictor score, $P_r$ is the outcome score for personal data record r, $A_r$ is the value in the action category of personal data record r, and R is the number of personal data records in the test set. In the above embodiment, $P_r$ may be a decimal value ranging between 0 and 1, and $A_r$ may be a binary number with a value either 0 or 1.

In another embodiment, the predictor score is the percentage of correct predictions when the outcome score is rounded to its nearest integer value. In this case, the predictor score would take the form $$S = \frac{1}{R} \sum_{r=1}^{R} (1 - (\lfloor P_r + 0.5 \rfloor - A_r)^2)$$

where [$P_r$+0.5] rounds $P_r$ to the nearest integer. As in the mean-square error case, $P_r$ may be a decimal value ranging between 0 and 1, and $A_r$ may be a binary number with a value either 0 or 1.

The steps of training 225 and testing 230 may be performed a number of times using different subsets of data from the training set to train 225 and test 230 the scoring engine. For example, the scoring engine may be trained in four iterations using four different subsets of the training set. Personal data records in the training set not used to train the scoring engine may be used to test the scoring engine such that, in the present example, a specific personal data record is used to train the scoring engine in one iteration and is used to test the scoring engine the other three iterations. The predictor scores for each iteration may be compared and the trained scoring engine with highest predictor score may then be used to predict outcomes in subsequent steps.

In step 235, the scoring engine is used to predict an outcome score for personal data records in one or more lawfully stored databases. In an embodiment, the one or more lawfully stored databases are the same as those used in step 215 to match the input set to databases of personal data records. The personal data records in the lawfully stored databases may therefore have the same categories as the personal data records in the training set. The outcome score $P_r$ for a personal data record r may be calculated as $P_r = e^{\theta^T x_r}/(1+e^{\theta^T x_r})$. For computational efficiency, the scoring engine may disregard categories where $\theta_i < \epsilon$ and form a reduced parameter vector $\hat{\theta}$ and a reduced personal data record $\hat{x}_r$ of size $\hat{N} \times 1$ where $\hat{\theta}_i > \epsilon$ for all $\hat{\theta}_i \in \hat{\theta}$. The outcome score may correspond to the probability that an individual associated with a personal data record will perform the action(s) represented by the action category of the training set. In an embodiment, the scoring engine determines an outcome score for a subset of the personal data records in the lawfully stored database(s).

In step 240, the subset of personal data records processed by the scoring engine is output. In an embodiment, only the personal data records comprising the X highest outcome scores are output. In another embodiment, all personal data records with outcome scores greater than an outcome threshold $P_0$ are output. In some embodiments, a subset of the categories for each personal data record are output, and the output categories may not correspond to the categories used by the scoring engine. For example, telephone numbers are unlikely to be useful to the scoring engine in forming predictions about whether an individual will participate in a marketing campaign, but would be useful to output since the telephone number could be used to contact the individual. In other embodiments, all of the categories are output.

In step 245, the method receives action values for previously output personal data records. For example, in step 240 the method may have output a personal data record corresponding to "Person X" with an outcome score of 0.7. In response to receiving this personal data record, a user may contact "Person X" and, in effect, test the outcome score of the scoring engine. The result of this test is an action value that can be delivered to the disclosed system to further refine the scoring engine. In step 250, for example, the output personal data record along with the newly discovered action value may be moved into the training set. This updated training set may then be used to re-train the scoring engine in step 225 for improved accuracy. A skilled artisan would understand that the initial scoring engine trained from the initial training set may be sufficient, and therefore steps 245 and 250 may be optional to the disclosed method.

Figure 3:
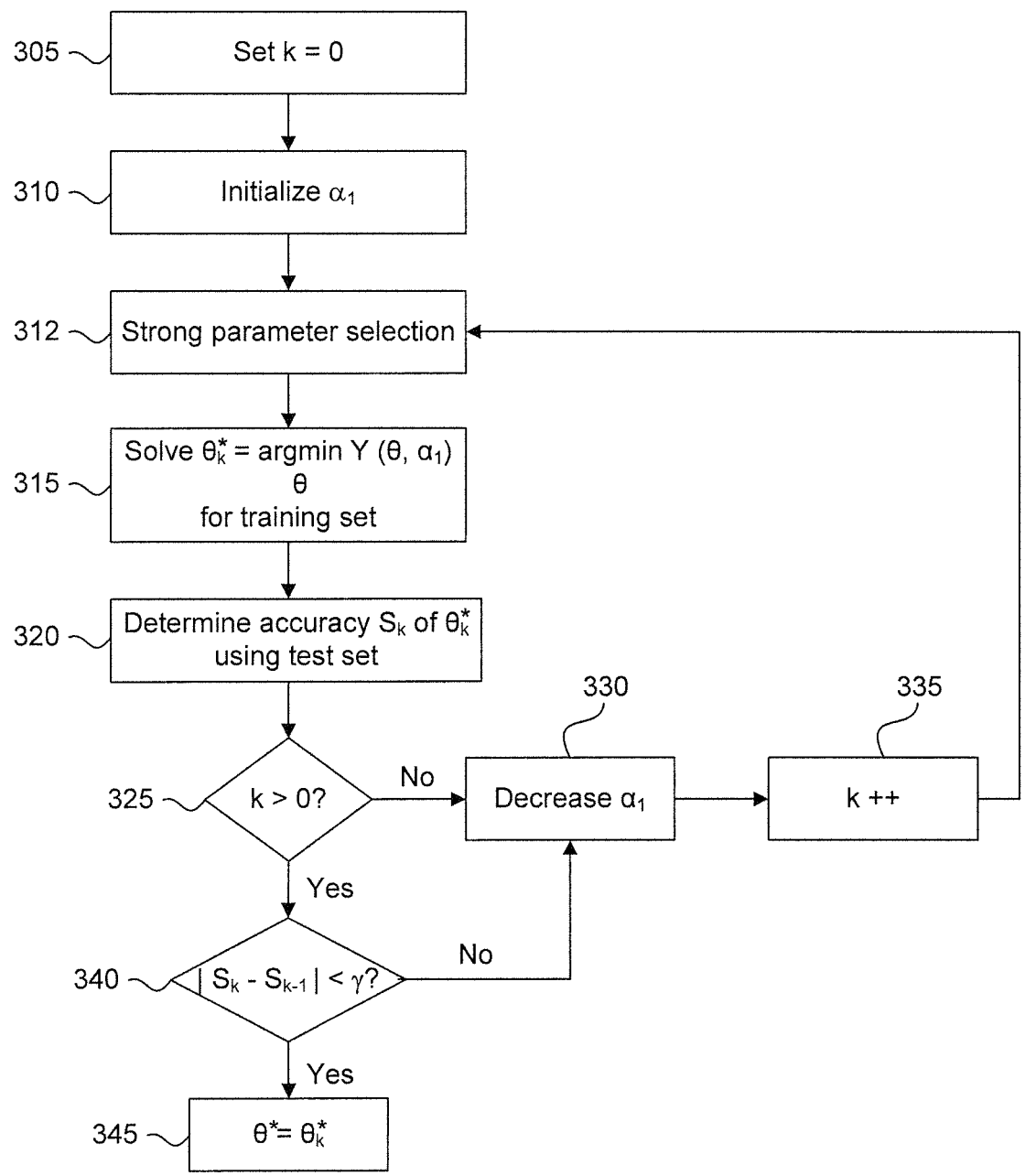
FIG. 3 is a flowchart of an exemplary method for training a scoring engine.

FIG. 3 is a flowchart of an exemplary method for training a scoring engine. In an embodiment, this method is used to find a parameter vector $\theta$ for the scoring engine modeled by the function $P=e^{\theta^T x}/(1+e^{\theta^T x})$. Training may require a plurality of iterations. In some embodiments, parameter $\alpha_1$, described below, is decreased at every iteration. In some embodiments, training continues until the difference between successive predictor scores $S_i$ and $S_{i-1}$ is less than a predetermined threshold $\gamma$.

The method begins in step 305 by setting iterator variable k equal to zero. Next, in step 310, an initial $\alpha_1$ is determined. In some embodiments, the initial $\alpha_1$ is large. As described below relative to step 315, the parameter $\alpha_1$ controls how many elements of parameter vector $\theta$ will be non-zero. A large $\alpha_1$ may result in very few, if any, non-zero elements of parameter vector $\theta$. Thus, parameter $\alpha_1$ controls how many categories of a personal data record are used for predicting the outcome score for an individual. It does not, however, dictate which categories are to be used for this prediction.

In step 312, parameter selection is performed at each iteration. Parameter selection reduces the computational complexity of step 315 by setting a subset of the values in $\theta$ to zero prior to solving for $\theta$ in step 315. The method does not solve for these values in step 315. In an embodiment, $\theta_j$ is set to 0 at iteration k whenever $|x_j^T (A-P(\theta^{(k-1)}))| < \gamma$, where A is the vector of action values. The threshold $\gamma$ may be a function of $\alpha_1$ and $\alpha_2$ at previous iterations. In an embodiment, $\gamma = \alpha_2(2\alpha_1^{(k)} - \alpha_1^{(k-1)})$.

In step 315, the method solves for the parameter vector $\theta$ that minimizes a cost function $Y(\theta, \alpha_1)$. In an embodiment, $$Y(\theta, \alpha_1) = \frac{1}{|M|} \sum_{m \in M} (A_m - P_m(\theta))^2 + \alpha_1 \sum_{i=1}^{N} |\theta_i| + \alpha_2 \sum_{i=1}^{N} |\theta_i|^2,$$

where M is the set of personal data records in the subset of the training set used for training, $A_m$ is the value in the action category for personal data record $m \in M$, $P_m(\theta) = e^{\theta^T x_m}/(1+e^{\theta^T x_m})$ is the outcome score for personal data record m, and $\alpha_2$ is a constant coefficient.

In another embodiment, $Y(\theta, \alpha_1) = -\Sigma_{m \in M} A_m \log P_m(\theta) + (1-A_m) \log(1-P_m(\theta)) - \alpha_1 (\alpha_2 \|\theta\|_1 + \frac{1}{2}(1-\alpha_2)\|\theta\|_2^2)$. In this embodiment, for a given $\alpha_1$, minimization of $Y(\theta, \alpha_1)$ is known as Elastic Net regularization and may be performed using conventional methods as would be understood by a person of skill in the art. The optimal parameter vector at iteration i is denoted as $\theta_i^*$. In other embodiments, insubstantial changes may be made to the above cost functions. The insubstantial changes may include adding small offsets, coefficients, and exponents.

As can be seen from the above equation, the coefficient $\alpha_1$ serves as a weight penalizing a large L1-norm for the vector $\theta$ (the L1-norm is $\|\theta\|_1 = \Sigma_{i=1}^{N} |\theta_i|$). Thus, the minimization will force elements of parameter vector $\theta$ to zero while maintaining a large log-likelihood (or small mean squared error) in the outcome score. Choosing a large $\alpha_1$ will, accordingly, result in a large penalty for a solution with many non-zero elements of parameter vector $\theta$, and thus most categories will not be considered for the scoring engine. Conversely, choosing $\alpha_1$ too small results in almost no penalty for a solution with many non-zero elements of parameter vector $\theta$, and thus most categories will be considered for the scoring engine. In other words, the size of the subset of categories considered by the scoring engine is inversely related to the magnitude of the coefficient $\alpha_1$.

In step 320, the method tests the accuracy of the parameter computed in step 315 using the subset of the training set known as the test set as previously described relative to FIG. 2. In an embodiment, step 320 in FIG. 3 corresponds to step 230 in FIG. 2. The method then continues to step 325 by determining if i>0—that is, if the current iteration is not the first iteration of the training process. If i=0, then the method decreases $\alpha_1$ in step 330, increments i in step 335, and finds a new $\theta_i$ in step 315. If i>0, then the method determines in step 340 whether the accuracies of successive solutions are within a threshold difference $\gamma$. If so, the training is said to have converged since decreasing $\alpha_1$ (i.e., increasing the number of categories used by the scoring engine) in the previous iteration did not result in significantly improved accuracy. In that case, the training process ends in step 345 by assigning the optimum solution $\theta^*=\theta_i$. Otherwise, the method again decreases $\alpha_1$ in step 330, increments i in step 335, and finds a new $\theta_i^*$ in step 315.

Figure 4:
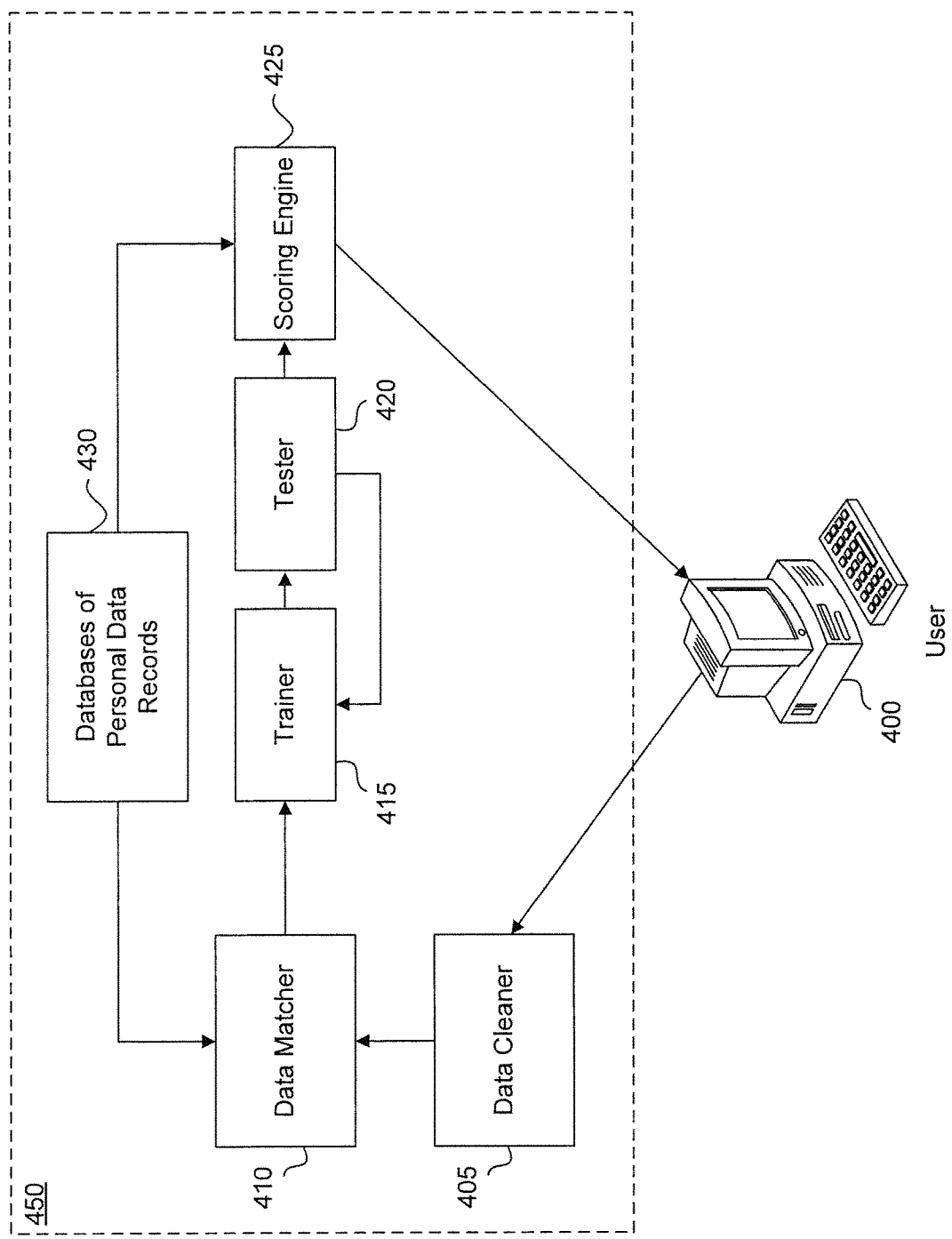
FIG. 4 illustrates an embodiment of the functional components of a system for predicting actions based on personal data records.

FIG. 4 illustrates an embodiment of the functional components of a modeling engine 450 for predicting actions based on personal data records. A user 400 interacts with the modeling engine 450 by providing input data to the data cleaner 405 and receiving an output set of personal data records with outcome scores from predictor 425. The input data may contain an action value for each entry as shown in FIG. 1. The data cleaner 405 may clean the data as described in above in relation to step 210 in FIG. 2.

The data cleaner 405 passes the cleaned data to the data matcher 410. The data matcher 410 may match the records contained in the cleaned data to personal data records in the lawfully stored databases of personal data records 430 based on determining that the same individual corresponds to matching records. Data matcher 410 may match records as described above in relation to step 215 in FIG. 2.

The data matcher 410 passes the matched data to the trainer 415. Within the trainer 415, the matched data is known as the training set. As previously described, the trainer 415 may partition the training set into subsets usable for either training or testing. The trainer 415 may train the scoring engine as describe above in relation to FIGS. 2 and 3.

The trainer 415 then passes the training data and the trained scoring engine to the tester 420. The tester 420 may test the accuracy of the trained scoring engine as described above in relation to FIGS. 2 and 3. The trainer 415 and tester 420 may iterate to find the best scoring engine by varying which subsets of the training set are usable for training or testing. In an embodiment, the trainer 415 and tester 420 may also iterate to find the best scoring engine by varying the Elastic Net parameter that effectively controls how many categories are considered by the scoring engine as described above in relation to FIG. 3.

The tester 420 passes the final parameter vector $\theta^*$ to the scoring engine 425, which applies the prediction function to the lawfully stored databases of personal data records 430. The scoring engine 425 determines an outcome score for a subset of the personal data records in lawfully stored databases 430. In an embodiment, the subset of the personal data records in lawfully stored databases 430 is a strict subset. In other embodiments, the subset is the entire database.

The scoring engine 425 outputs one or more personal data records from the subset to the user. In an embodiment, the output comprises a strict subset of the categories of the personal data records in lawfully stored databases 430. In some embodiments, the output categories may not coincide with the categories considered by the scoring engine to form an output score. In further embodiments, one or more categories may be an output category and also be considered by the scoring engine 425 to form an output score. In an embodiment, the output score is one of the output categories. In some embodiments, the user specifies how many personal data records to output. In some embodiments, the user specifies that only personal data records with an outcome score above a threshold shall be output. Furthermore, in some embodiments, the user may request output data from the modeling engine 450 without providing input data. Such embodiments include a modeling engine 450 with a scoring engine 425 that has previously been trained.

Figure 5:
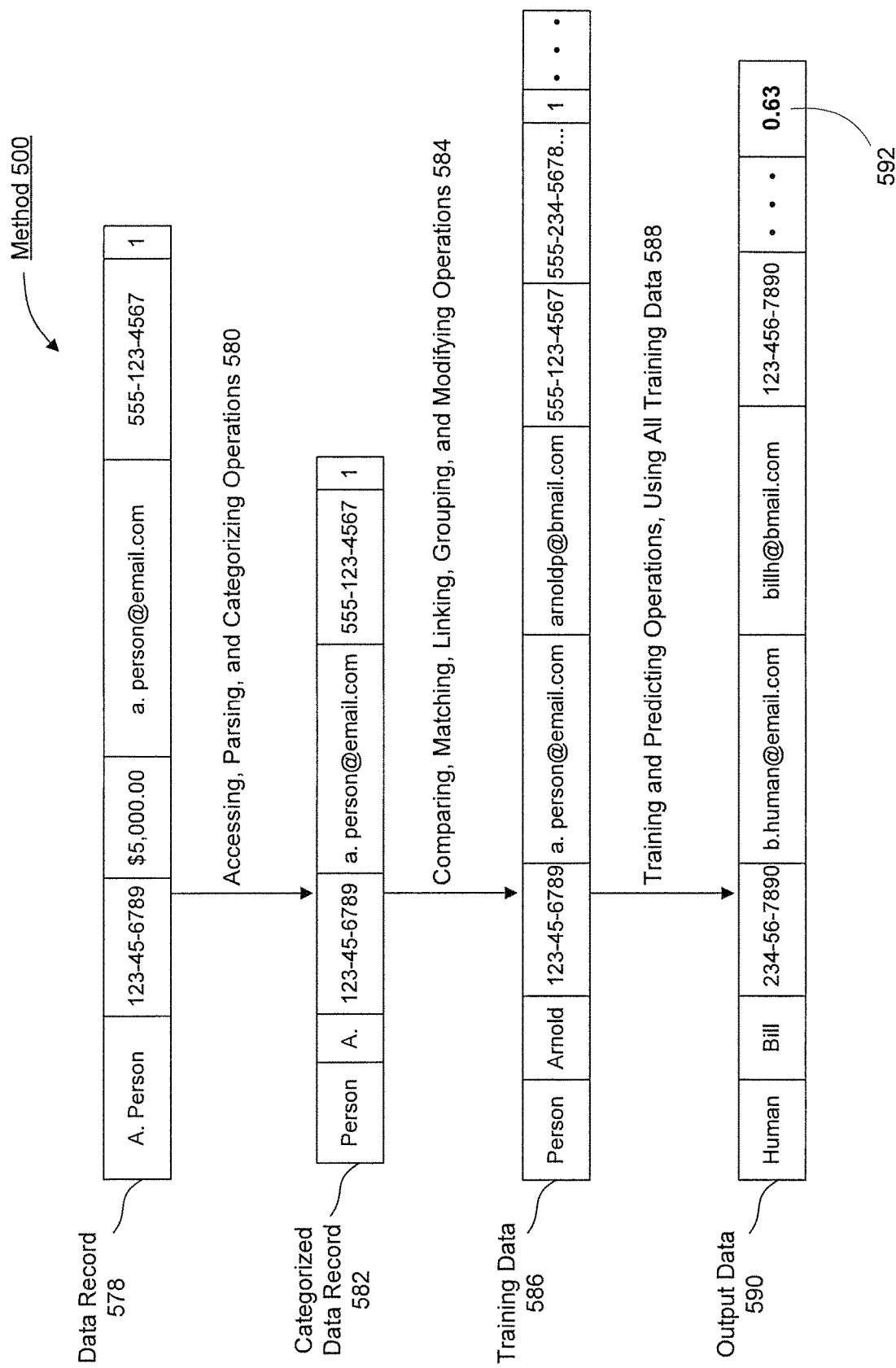
FIG. 5 illustrates a first exemplary personal data record as it is processed by the system and used to predict an action for a second exemplary personal data record.

FIG. 5 illustrates a flow diagram of an exemplary method 500, for predicting behaviors of individuals based on data produced/modified using various embodiments of the foregoing methods and systems.

As shown, FIG. 5 depicts the contents of an exemplary data record 578 describing an individual. In an embodiment, data record 578 may be consumer data, such as an individual's purchasing history; web-browsing data, such as an individual's browsing and/or web-purchase history, lawfully tracked using first- or third-party cookies; an individual's mortgage history; or any other personal data that may be lawfully tracked or purchased through commonly used methods.

At step 580, a processor (such as processor 104 or computing device(s) 126 of FIG. 1) accesses, parses, and categorizes data record 278 in accordance with the foregoing embodiments, resulting in categorized data record 582.

At step 584, the processor compares categorized data record 582 against additional data records in order to determine whether categorized data record 582 should be linked, grouped, and modified to mirror the identity described by separate data record, in accordance with the foregoing embodiments. Resulting from step 584 is training data 586.

At step 588, training data 586 is entered into a training system in order to compare and find individuals possessing similar interests, preferences, and other demographic data. Step 588 further includes predicting future behaviors of similar individuals, based on an order of similarity between the individuals. For example, after comparing the training data 586 against additional data records, an outcome score may be calculated. Step 588 returns output data 590, having outcome score 592.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A system, comprising:
   a memory; and
   one or more processors electronically coupled to the memory and configured to:
   access a training set stored in the memory, the training set having a plurality of personal data training records and a plurality of categories associated with each personal data training record, wherein the plurality of categories comprises an action taken by an individual corresponding to the associated personal data training record;
   determine a subset of the plurality of categories based on at least a first plurality of personal data training records in the training set;
   determine a first prediction function using the first plurality of personal data training records that outputs an outcome score based on values of the subset of the plurality of categories, wherein to determine the first prediction function, the one or more processors are further configured to:
   vary a number of categories of the first plurality of personal data training records by monotonically decreasing a penalty coefficient; and
   determine the first prediction function when an accuracy of successive solutions calculated by varying the number of categories has converged;
   test the accuracy of the first prediction function based at least on a second plurality of personal data training records in the training set different from the first plurality of personal data training records in the training set, wherein testing the accuracy of the first prediction function produces a first predictor score;
   determine a second prediction function using the second plurality of personal data training records, wherein to determine the second prediction function, the one or more processors are further configured to:
   vary a number of categories of the second plurality of personal data training records; and
   determine the second prediction function when an accuracy of successive solutions calculated by varying the number of categories has converged;
   test the accuracy of the second prediction function based on at least the first plurality of personal data training records to produce a second predictor score;
   compare the first predictor score and the second predictor score to select an outcome generation prediction function from the first prediction function and the second prediction function;
   access a data set stored in memory, the data set having a number of personal data records greater than the number of personal data training records in the training set, the data set having the plurality of categories associated with each personal data record; and
   process a subset of the personal data records from the data set based on the selected outcome generation prediction function to determine an outcome score for each personal data record in the subset of personal data records.

2. The system of claim 1, wherein determining the subset of the plurality of categories comprises determining a weight for each category.

3. The system of claim 2, wherein determining a weight for each category comprises:
   initializing a coefficient; and
   computing a weight vector that optimizes a function based on the subset of the plurality of categories, the function including the coefficient multiplied by the sum of the absolute values of each element in the weight vector;
   wherein each element in the weight vector corresponds to a weight for a category.

4. The system of claim 3, wherein the size of the subset of the plurality of categories is related to the magnitude of the coefficient.

5. The system of claim 1, wherein the first prediction function substantially satisfies the equation $$P = \frac{e^{\theta^T x}}{1 + e^{\theta^T x}};$$

wherein P is the first prediction function,
wherein e is Euler's number,
wherein $\theta$ is a column vector of parameters, and
wherein x is a column vector of values corresponding to categories of a personal data record.

6. The system of claim 5, wherein determining the subset of the plurality of categories comprises determining a value for $\theta$ that substantially minimizes the equation $$Y(\theta, \alpha_1) = -\Sigma_{m \in M} A_m \log P_m(\theta) + (1-A_m)\log(1-P_m(\theta)) - \alpha_1(\alpha_2 \|\theta\|_1 + \frac{1}{2}(1-\alpha_2)\|\theta\|_2^2)$$

wherein M is the first plurality of personal data training records in the training set,
wherein $A_m$ is the action taken by an individual corresponding to the personal data record $m \in M$,
wherein $P_m(\theta) = e^{\theta^T x_m}/(1+e^{\theta^T x_m})$ is the outcome score for personal data record m,
wherein $\alpha_1$ is a coefficient, and
wherein $\alpha_2$ is a constant coefficient.

7. A computer implemented method, comprising:
   accessing a training set stored in memory, the training set having a plurality of personal data training records and a plurality of categories associated with each personal data training record, and the plurality of categories comprises an action taken by an individual corresponding to the associated personal data training record;
   determining a subset of the plurality of categories based on at least a first plurality of personal data training records in the training set;

determining a first prediction function using the first plurality of personal data training records that outputs an outcome score based on the subset of the plurality of categories, wherein determining the first prediction function further comprises:
  varying a number of categories of the first plurality of personal data training records by monotonically decreasing a penalty coefficient; and
  determining the first prediction function when an accuracy of successive solutions calculated by varying the number of categories has converged;
testing the accuracy of the first prediction function based on at least a second plurality of personal data training records in the training set different from the first plurality of personal data training records in the training set, wherein testing the accuracy of the first prediction function produces a first predictor score;
determining a second prediction function using the second plurality of personal data training records, wherein determining the second prediction function further comprises:
  varying a number of categories of the second plurality of personal data training records; and
  determining the second prediction function when an accuracy of successive solutions calculated by varying the number of categories has converged;
testing the accuracy of the second prediction function based on at least the first plurality of personal data training records to produce a second predictor score;
comparing the first predictor score and the second predictor score to select an outcome generation prediction function from the first prediction function and the second prediction function;
accessing a data set stored in memory, the data set having a number of personal data records greater than the number of personal data training records in the training set, the data set having a plurality of categories associated with each personal data record; and
processing a subset of the personal data records from the data set based on the selected outcome generation prediction function and the subset of categories to determine an outcome score for each personal data record in the subset of personal data records.

8. The method of claim 7, further comprising:
receiving an action taken by an individual corresponding to at least one personal data record in the subset of personal data records from the data set;
replacing the outcome score for the at least one personal data record with the received outcome; and
moving the at least one personal data record from the data set to the training set.

9. The method of claim 7, wherein determining the subset of the plurality of categories comprises determining a weight for each category.

10. The method of claim 9, wherein determining a weight for each category comprises:
initializing a coefficient; and
computing a weight vector that optimizes a function based on the subset of the plurality of categories, the function including the coefficient multiplied by the sum of the absolute values of each element in the weight vector;
wherein each element in the weight vector corresponds to a weight for a category.

11. The method of claim 10, wherein the size of the subset of the plurality of categories is related to the magnitude of the coefficient.

12. The method of claim 7, wherein the first prediction function substantially satisfies the equation $$P = \frac{e^{\theta^T x}}{1 + e^{\theta^T x}};$$

wherein P is the first prediction function,
wherein e is Euler's number,
wherein θ is a column vector of parameters, and
wherein x is a column vector of values corresponding to categories of a personal data record.

13. A non-transitory computer-readable device having instructions stored thereon that, when executed by at least one computing device, causes the at least one computing device to perform operations comprising:
accessing a training set stored in memory, the training set having a plurality of personal data training records and a plurality of categories associated with each personal data training record, and the plurality of categories comprises an action taken by an individual corresponding to the associated personal data training record;
determining a subset of the plurality of categories based on the outcome of at least a first personal data training record in the training set;
determining a first prediction function based on the subset of the plurality of categories, wherein determining the first prediction function further comprises:
  varying a number of categories of the first plurality of personal data training records by monotonically decreasing a penalty coefficient; and
  determining the first prediction function when an accuracy of successive solutions calculated by varying the number of categories has converged;
testing the accuracy of the first prediction function based on at least a second personal data training record in the training set different from the first personal data training record in the training set, wherein testing the accuracy of the first prediction function produces a first predictor score;
determining a second prediction function using the second personal data training record, wherein determining the second prediction function further comprises:
  varying a number of categories of the second plurality of personal data training records; and
  determining the second prediction function when an accuracy of successive solutions calculated by varying the number of categories has converged;
testing the accuracy of the second prediction function based on at least the first personal data training record to produce a second predictor score;
comparing the first predictor score and the second predictor score to select an outcome generation prediction function from the first prediction function and the second prediction function;
accessing a data set stored in memory, the data set having a number of personal data records greater than the number of personal data training records in the training set, the data set having a plurality of categories associated with each personal data record; and
processing a subset of the personal data records from the data set based on the selected outcome generation prediction function and the subset of categories to determine an outcome score for each personal data record in the subset of personal data records.

14. The computer-readable device of claim 13, wherein the operation of determining the subset of the plurality of categories comprises determining a weight for each category.

15. The computer-readable device of claim 14, wherein the operation of determining a weight for each category comprises:
    initializing a coefficient; and
    computing a weight vector that optimizes a function based on the subset of the plurality of categories, the function including the coefficient multiplied by the sum of the absolute values of each element in the weight vector;
    wherein each element in the weight vector corresponds to a weight for a category.

16. The computer-readable device of claim 15, wherein the size of the subset of the plurality of categories is related to the magnitude of the coefficient.

17. The computer-readable device of claim 13, wherein the first prediction function substantially satisfies the equation $$P = \frac{e^{\theta^T x}}{1 + e^{\theta^T x}};$$

wherein P is the first prediction function,
wherein e is Euler's number,
wherein θ is a column vector of parameters, and
wherein x is a column vector of values corresponding to categories of a personal data record.

\* \* \* \* \*